United States Patent [19]
Hussey
[11] Patent Number: 4,853,492
[45] Date of Patent: Aug. 1, 1989

[54] ELECTRIC TRANSMISSION CONDUCTOR SUPPORT INSULATORS

[76] Inventor: Carl L. Hussey, 214 Linda La., West Palm Beach, Fla. 33405

[21] Appl. No.: 250,073
[22] Filed: Sep. 28, 1988
[51] Int. Cl.[4] ........................ H01B 17/14; H02G 7/20
[52] U.S. Cl. ................................ 174/174; 174/45 R; 174/173; 174/212; D13/18
[58] Field of Search ............. 174/45 R, 149 R, 158 R, 174/163 R, 165, 172, 173, 174, 175, 194, 195, 206, 212; 52/40; D13/17, 18

[56] References Cited

U.S. PATENT DOCUMENTS

| | | | |
|---|---|---|---|
| 41,157 | 1/1864 | Holland | 174/174 X |
| 443,508 | 12/1890 | Emmet | 174/45 R |
| 456,683 | 7/1891 | Verstraete | 174/149 R X |
| 1,342,111 | 6/1920 | Howe | 174/174 X |

FOREIGN PATENT DOCUMENTS

| | | | |
|---|---|---|---|
| 460895 | 10/1968 | Switzerland | 174/194 |
| 682715 | 11/1952 | United Kingdom | 174/173 |

*Primary Examiner*—Laramie E. Askin
*Attorney, Agent, or Firm*—Carroll F. Palmer

[57] ABSTRACT

An electric transmission conductor support insulator made of plastic material for mounting on the top of a utility pole basically includes an elongated cylindrical body having a top end and a bottom end, a longitudinal bore within the body extending through the bottom end and tapering inwardly toward the top end, at least one circular ledge extending laterally from the body. The ledge has an upper surface, a lower surface and a side surface, the upper and lower surfaces are positioned normal to the longitudinal axis of the body, the lower surface being larger in diameter than the upper surface with the side surface sloping inwardly toward the body from the lower surface to the upper surface, and there is a circular notch in the side of the body juxtaposed above the ledge which notch is sized to admit a substantial portion of a conductor to be supported by the insulator.

7 Claims, 3 Drawing Sheets

ELECTRIC TRANSMISSION CONDUCTOR SUPPORT INSULATORS

FIELD OF THE INVENTION

This application relates to insulators to support electric transmission conductors, e.g., high tension electric lines. More particularly, it concerns such insulators made of plastic material for mounting on the top of a utility pole without need for mounting brackets or the like.

BACKGROUND OF THE INVENTION

Over the years, many different methods for supporting electrical conductors have been tried (see U.S. Pat. Nos. 41,157; 443,508 & 456,683). However, wooden crossarms with pin insulators has been the construction type that has been used for a majority of the present century by the utility industry.

More recently, these same pin insulators were positioned on fiberglass brackets attached directly to the utility pole in place of the deterioration-prone wooden crossarms. However, due to the rapid decay of the fiberglass from atmospheric conditions, a porcelain post insulator replaced the pin insulator. The post insulator was bonded to a metallic base, which, in turn, was bolted to the utility pole. A metallic standoff bracket, to which the post insulator was bolted, replaced the old base. This was because the existing adhesive that affixed the post insulator to the metallic base failed under the variable stresses of the electrical conductor.

Unfortunately, many pieces of hardware are still required to support the electrical conductors, e.g., angle clamps, bolts, insulators, nuts, washers, etc. and much labor is also, e.g., drilling, fastening, fitting, etc. Further, porcelain insulators are prone to explode under severe electrical stress conditions. Hence, a need exists for improvements in electric conductor support devices that reduce the number of pieces of hardware and the amount of labor required for installation.

OBJECTS

A principal object of the invention is the provision of new forms of insulators to support electric transmission conductors.

A further object is the provision of such insulators that are made of plastic material and capable of being mounted on the tops of utility poles, thereby eliminating the need for use of crossarms, standoff brackets or the like.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished in accordance with the invention by the provision of electric transmission conductor support insulators made of plastic material for mounting on the top of a utility pole that basically comprise an elongated cylindrical body having a top end and a bottom end, a longitudinal bore within the body extending through the bottom end and tapering inwardly toward the top end, and at least one circular ledge extending laterally from the body.

The ledge has an upper surface, a lower surface and a side surface, the upper and lower surfaces being positioned normal to the longitudinal axis of the body, the lower surface being larger in diameter than the upper surface with the side surface sloping inwardly toward the body from the lower surface to the upper surface, and there is a circular notch in the side of the body juxtaposed above the ledge.

In preferred embodiments, the elongated cylindrical body has a closed top end and an open bottom end, there are a plurality of the circular ledges extending laterally from and spaced apart along the body and the notches are sized to accept at least one-quarter of the periphery of a conductor to be supported by the insulator.

In further embodiments, (1) the longitudinal axis of the bore is eccentric to the longitudinal axis of the body, and (2) the top end of the body has a flat upper surface that contains at least one semi-circular groove and, preferably, three intersecting grooves therein.

BRIEF DESCRIPTION OF THE DRAWINGS

A more complete understanding of the invention can be obtained by reference to the accompanying drawings in which.

DESCRIPTION OF THE PREFERRED EMBODIMENTS

Figure 1:
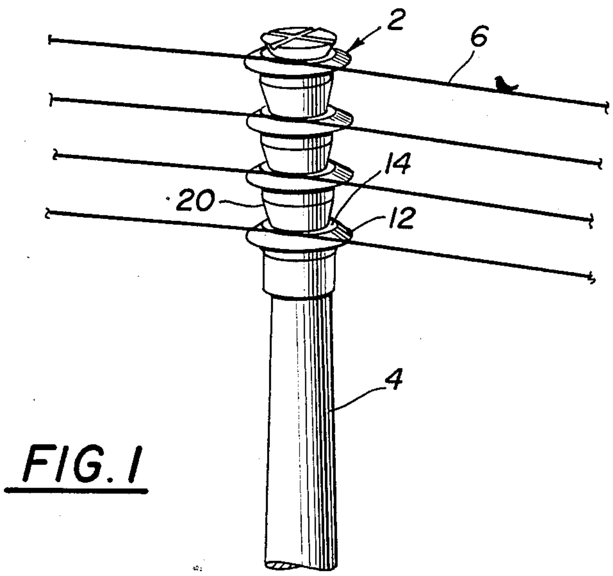
FIG. 1 is an isometric view of an insulator of the invention mounted on a utility pole and supporting electric transmission conductors.
Figure 4:
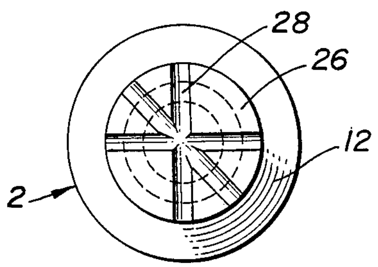
FIG. 4 is a plan view of the top end of the insulator shown in FIG. 2.
Figure 2:
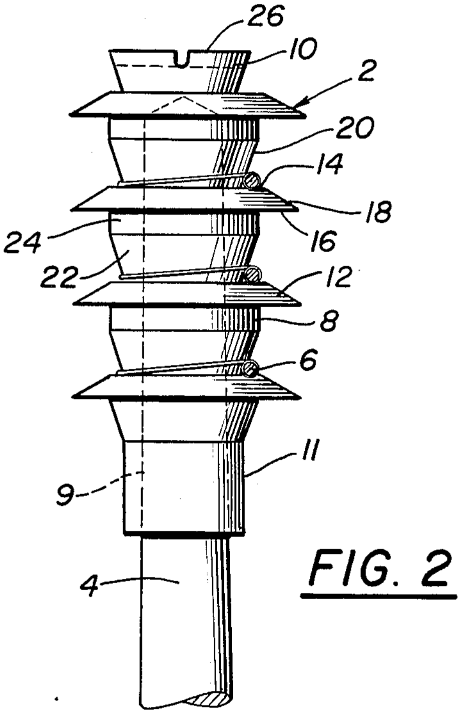
FIG. 2 is a lateral view of the insulator shown in FIG. 1.

Referring in detail to the drawings in which identical items are identified by the same numeral, an electric insulator 2 made of plastic material is mounted on the top of a utility pole 4 and supports transmission conductors 6.

The insulator 2 comprises an elongated cylindrical body 8 having a closed top end 10 and an open bottom end 11. A longitudinal bore 9 within the body 8 extends through the bottom end 11 and tapers inwardly toward the top end 10. A plurality of circular ledges 12 extend laterally from and are spaced apart along the body 8.

The ledges 12 have an upper surface 14, a lower surface 16 and a side surface 18.

A circular notch 20 in the side of the body 8 is juxtaposed above each ledge 12 and the notches 20 are sized to accept at least one-quarter of the periphery of conductors 6 supported by the insulator 2. As shown, the notches 20 are downwardly and inwardly tapers 22 in the peripheral surface 24 of said body 8 positioned above each ledge 12.

The top end 10 of body 8 has a flat upper surface 26 with three intersecting grooves 28 therein designed to receive transmission conductors at various angles.

In the second embodiment of the insulators **2*a* of the invention, the body 8*a* has a longitudinal slit 30 extending from said top end 10*a* to said bottom end 11*a*. Like the insulator 2, the embodiment 2*a* includes a tapered longitudinal bore 9*a*, ledges 12 and notches 20**.

Figure 3:
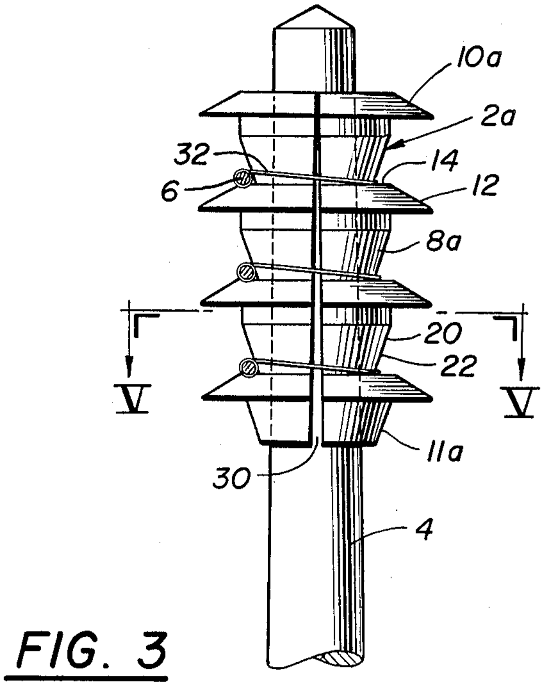
FIG. 3 is a lateral view of a second embodiment of an insulator of the invention.
Figure 5:
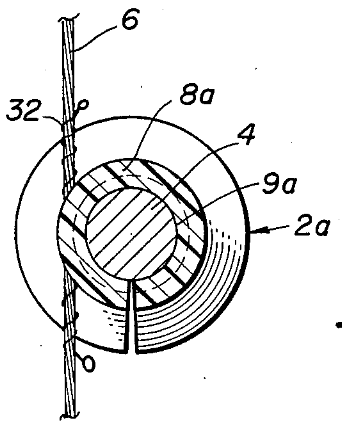
FIG. 5 is a sectional view taken on the line V—V of FIG. 3.

FIGS. 3 & 5 serve to show the unique manner in which transmission conductors 6 can be fixedly mounted on the insulators of the invention. The notches 20 are sized so that at least one-quarter of the periphery of the conductor 6 will fit into the notch 20 (see FIG. 3). With the conductor 6 resting on the top surface 14 of the ledge 12 of insulator **2*a*, the tie wire 32 is spiralled around the conductor 6, then around the back side of the notch 20 and then is spiralled again around the conductor 6. In this fixation system, the inward tapers 22 serve to ensure that the tie wires 32 remain fully locked onto the insulator 2*a* by providing a lever action in maintaining tension of the tie wire 32 on locking the conductor 6 to the insulator 2*a***.

Figure 6:
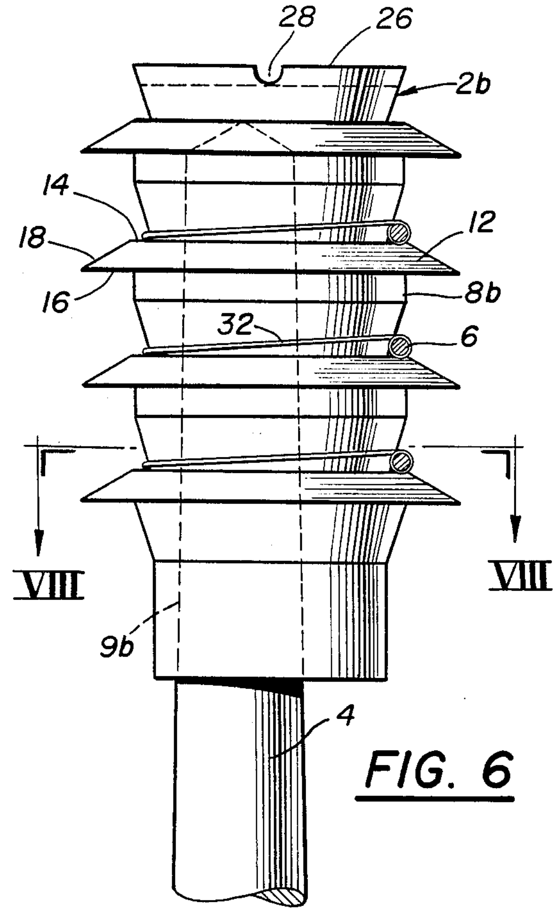
FIG. 6 is a lateral view of a third embodiment of an insulator of the invention.
Figure 7:
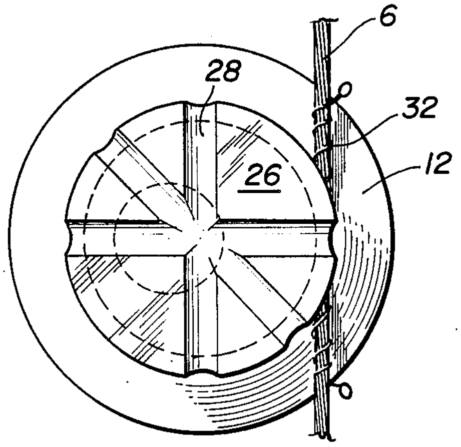
FIG. 7 is a plan view of the top of the third embodiment insulator of the invention.
Figure 8:
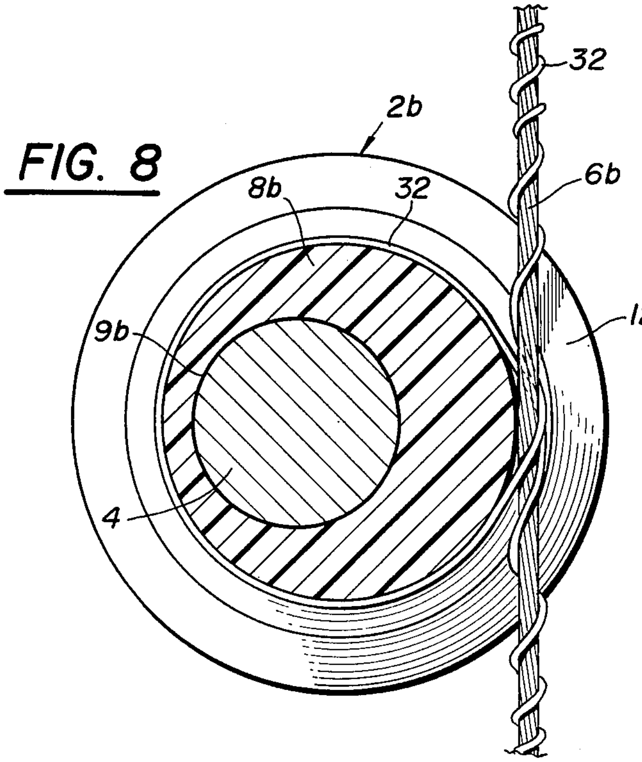
FIG. 8 is a sectional view taken on the line VIII—VIII of FIG. 6.

The insulator **2*b* of FIG. 6 includes an eccentric tapered bore 9*b*. This eccentric design permits bodies 8*b* to have diameters that allow for larger diameter conductors 6*b* to be totally wrapped around the insulator 2*b* (not shown) without the minimum radius of curvature of the conductor being exceeded, with the result that none of the strands of the conductor 6*b*, when so wrapped, is broken in being totally wrapped around the insulator 2*b***.

Figure 9:
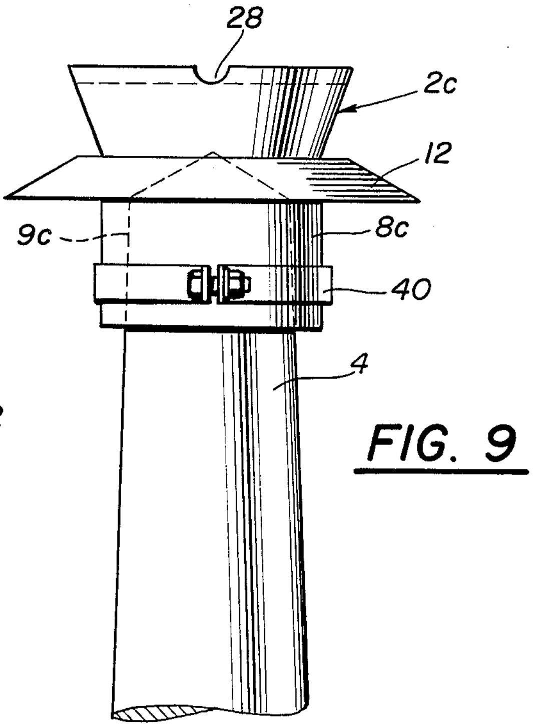
FIG. 9 is a lateral view of a fourth embodiment of an insulator of the invention.

The insulator **2*c* of FIG. 9 has a single ledge 12 and is assisted by the use of the optional compression clamp 40 in its attachment to pole 4 when its bore 9*c* is placed upon the top end of the pole 4**.

Figure 10:
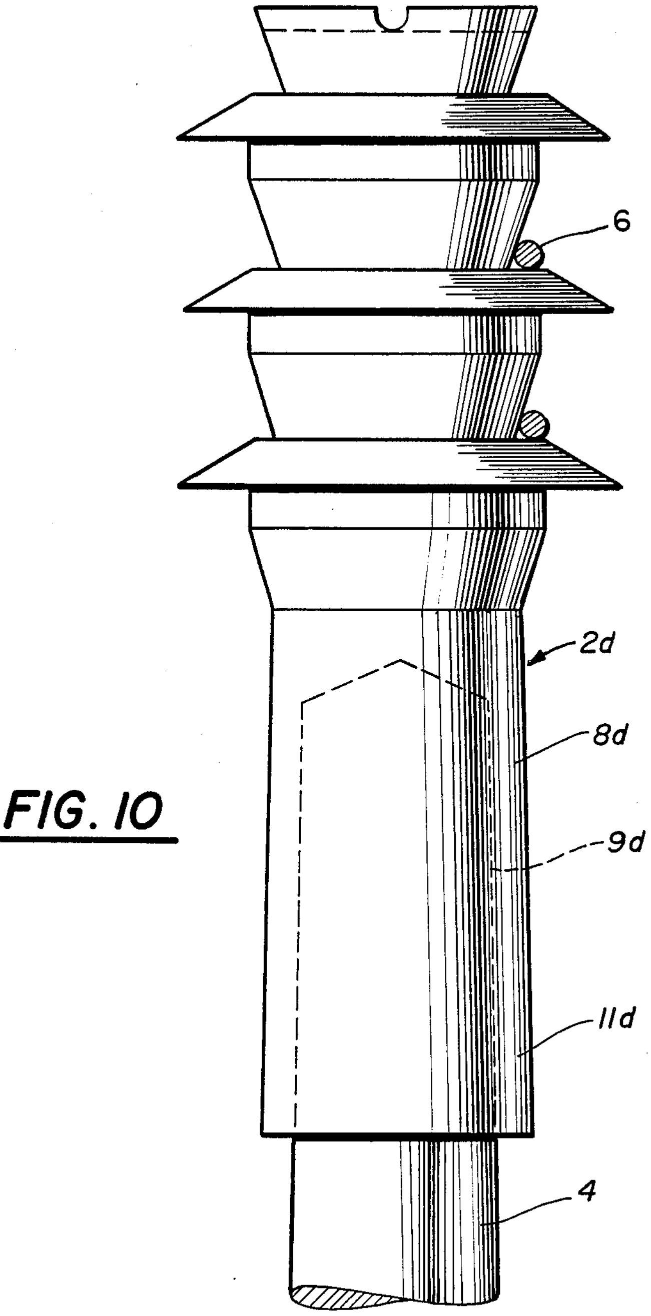
FIG. 10 is a lateral view of a fifth embodiment of an insulator of the invention.

In the insulator **2*d* of FIG. 10, the bore 9*d* does not extend into the body 8*d* as far as in the previously described embodiments and the bottom end 11*d* is more extended. This embodiment is an "extension" insulator for raising the height at which the conductors 6 are supported without need for replacing an existing pole 4** with a higher one.

The embodiments of the invention in which an exclusive property or privilege is claimed are defined as follows:

1. An electric transmission conductor support insulator made of plastic material for mounting on the top of a support pole that comprises:

an elongated cylindrical body having a top end and a bottom end, a longitudinal bore within said body extending through said bottom end and tapering inwardly toward said top end, at least one circular ledge extending laterally from said body, said ledge having an upper surface, a lower surface and a side surface, said upper and lower surfaces being positioned normal to the longitudinal axis of said body, said lower surface being larger in diameter than said upper surface with said side surface sloping inwardly toward said body from said lower surface to said upper surface, and a circular notch in the side of said body juxtaposed above said ledge.

2. An electric transmission conductor support insulator made of plastic material for mounting on the top of a support pole that comprises:

an elongated cylindrical body having a closed top end and a bottom end, a longitudinal bore within said body extending through said bottom end and tapering inwardly toward said top end, a plurality of circular ledges extending laterally from and spaced apart along said body, said ledges each having an upper surface, a lower surface and a side surface, said upper and lower surfaces being positioned normal to the longitudinal axis of said body, said lower surface being larger in diameter than said upper surface with said side surface sloping inwardly toward said body from said lower surface to said upper surface, and a circular notch in the side of said body juxtaposed above each said ledge, said notches being sized to accept at least one-quarter of the periphery of a conductor to be supported by said insulator.

3. The electric transmission conductor support insulator of claim 2 wherein said notches are downwardly and inwardly tapers in the peripheral surface of said body positioned above each ledge.

4. The electric transmission conductor support insulator of claim 2 wherein the longitudinal axis of said bore is eccentric to the longitudinal axis of said body.

5. The electric transmission conductor support insulator of claim 2 wherein said top end has a flat upper surface that contains at least one semi-circular groove therein.

6. The electric transmission conductor support insulator of claim 5 that has three intersecting grooves in said upper surface.

7. The electric transmission conductor support insulator of claim 2 wherein said body has a longitudinal slit in said body extending from said top end to said bottom end.

* * * * *